June 17, 1969

D. V. GOLAND ET AL 3,450,028

STRAPPING APPARATUS

Filed July 17, 1967

Sheet 1 of 10

June 17, 1969 D. V. GOLAND ET AL 3,450,028

STRAPPING APPARATUS

Filed July 17, 1967

Sheet 10 of 10

United States Patent Office 3,450,028
Patented June 17, 1969

3,450,028

STRAPPING APPARATUS

David V. Goland, North Balwyn, Victoria, and Samuel E. Stapleton, Niddrie, Victoria, Australia, assignors, by mesne assignments, to Signode Corporation, Chicago, Ill., a corporation of Delaware Filed July 17, 1967, Ser. No. 653,900
Claims priority, application Australia, July 21, 1966, 8,649/66
Int. Cl. B65b *13/04;* B30b *15/32, 7/04*
U.S. Cl. 100—7 5 Claims

ABSTRACT OF THE DISCLOSURE

This invention relates to a press for baling wool and various other materials. The press includes vertically and transversely movable plattens which serve to form a compression chamber wherein material disposed therein is compressed into a highly compact bale. Inlet and outlet doors are arranged on opposite sides of the base platten, and the plattens are provided with guide means for strap to be disposed about the bale.

Figure 1:
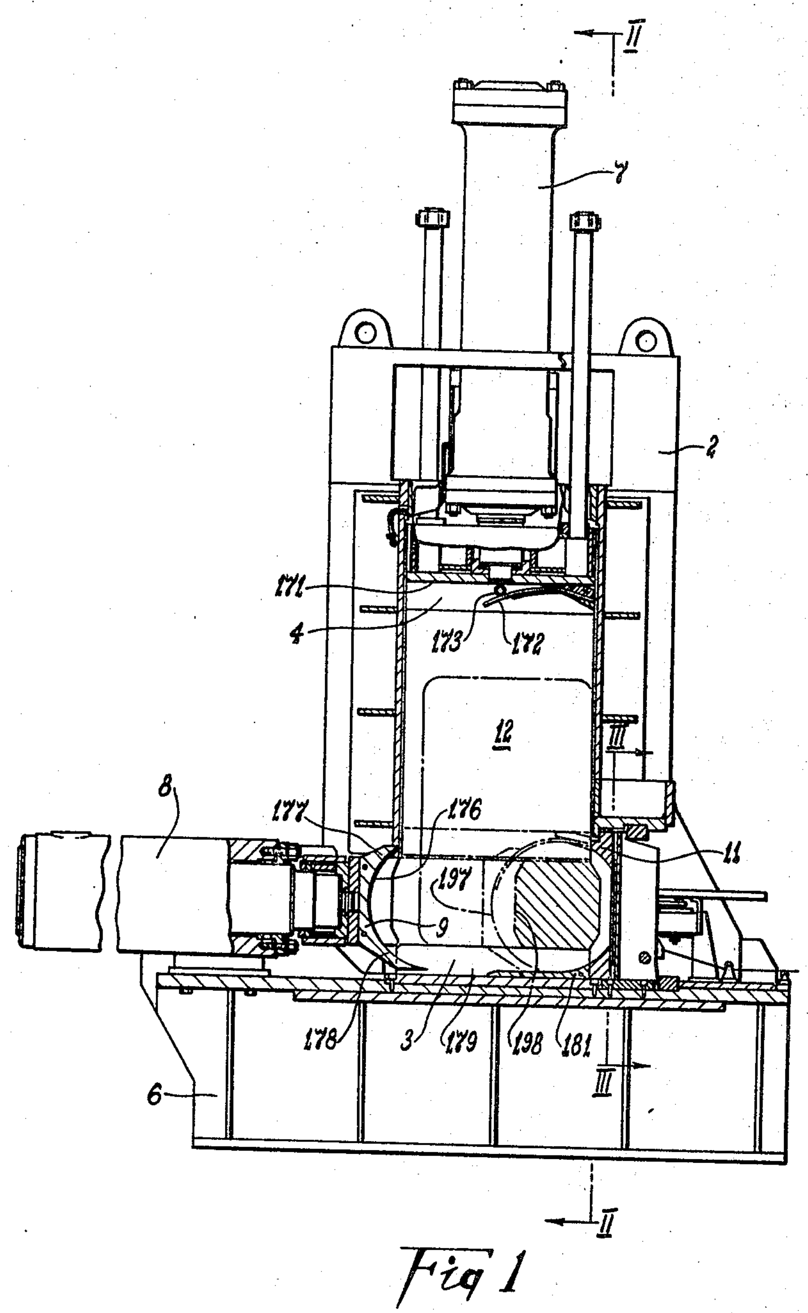

This invention relates to presses employing strapping apparatus of the kind adapted to feed and secure one or more flexible straps around a bundle, package, bale, or the like. For convenience, such apparatus will be hereinafter referred to as strapping apparatus of the kind indicated.

The invention is particularly applicable for use in association with a wool bale press, in which case the apparatus is adapted to feed and secure one or more straps simultaneously about a wool bale while the bale is held compressed between plattens of the press. It will therefore be convenient to describe the invention in relation to strapping of wool bales, but it is to be understood that the invention is not limited to that particular application. In addition, the invention is not limited to use with the particular press hereinafter described, since that press is described by way of example only.

In the past, strapping apparatus of the kind indicated has involved a considerable amount of complex mechanism. Furthermore, such apparatus is not generally adaptable for use with high density baling presses, and this a major disadvantage since high density baling of wool in particular is becoming increasingly popular.

It is a principal object of this invention to provide strapping apparatus of the kind indicated which is of relatively simple and inexpensive construction, and which maintains a high degree of efficiency. It is a further object of the invention to provide such apparatus which is applicable for use in association with presses of the conventional single movable platten type, or high density presses such as those used in high density pressing of wool bales.

The relative terms "inner" and "outer," or words of similar import, as used throughout this specification are to be construed in relation to the space occupied by a bale in the press. That is, the "inner" surface of a platen for example, will be the surface which is engageable with a bale located within the press.

According to the present invention, there is provided strapping apparatus of the kind indicated including; a main assembly having feeding and tensioning means for feeding a strap about a bundle and subsequently tensioning same, and a sealing head for securing a seal blank about overlapped portions of said strap; said sealing head having gripping means for releasably gripping said strap at a leading end portion thereof relative to the direction of feed to permit the strap to be tensioned about said bale, seal blank crimping means, and strap severing means;

guide means for guiding the strap about said bundle; release mechanism operable to allow the secured overlapped portions of said strap to move clear of the sealing head; sealing head operating mechanism operable in two stages and arranged so that during said first stage said sealing head is operated to cause the gripping means to adopt its strap gripping position, and during said second stage said sealing head operates to move the crimping means and severing means into their seal blank crimping and strap severing positions respectively; and control means for causing a delay between said first and second stages of operation, during which delay said strap is tensioned to a predetermined degree about said bundle.

Figure 2:
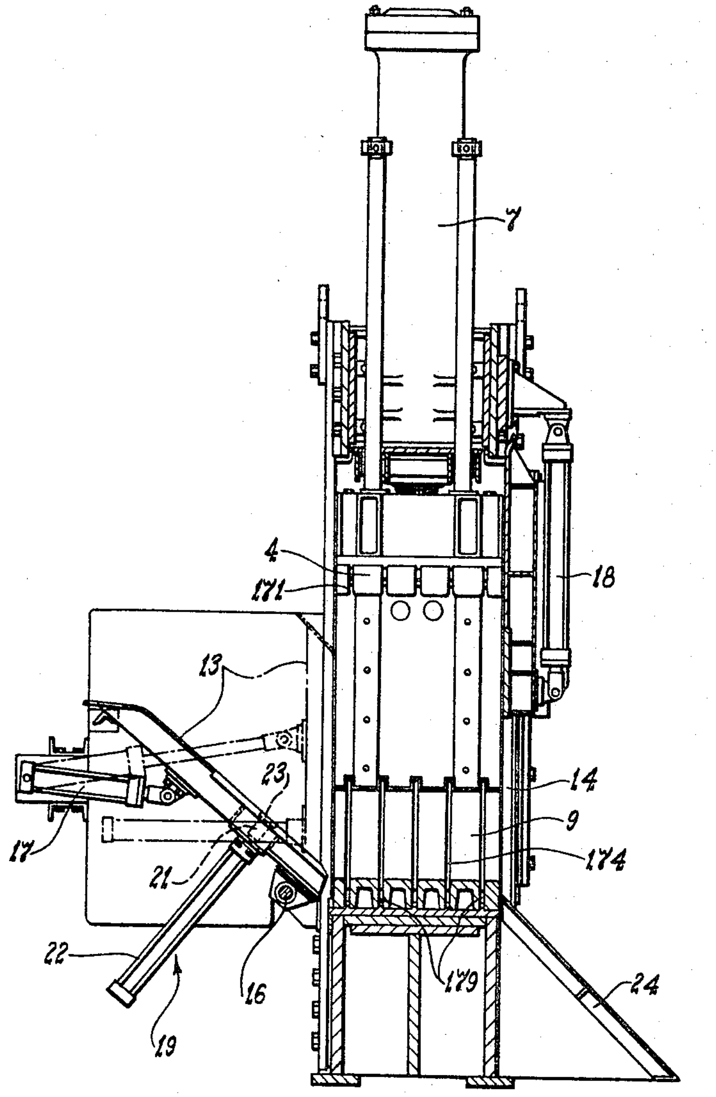
Figure 3:
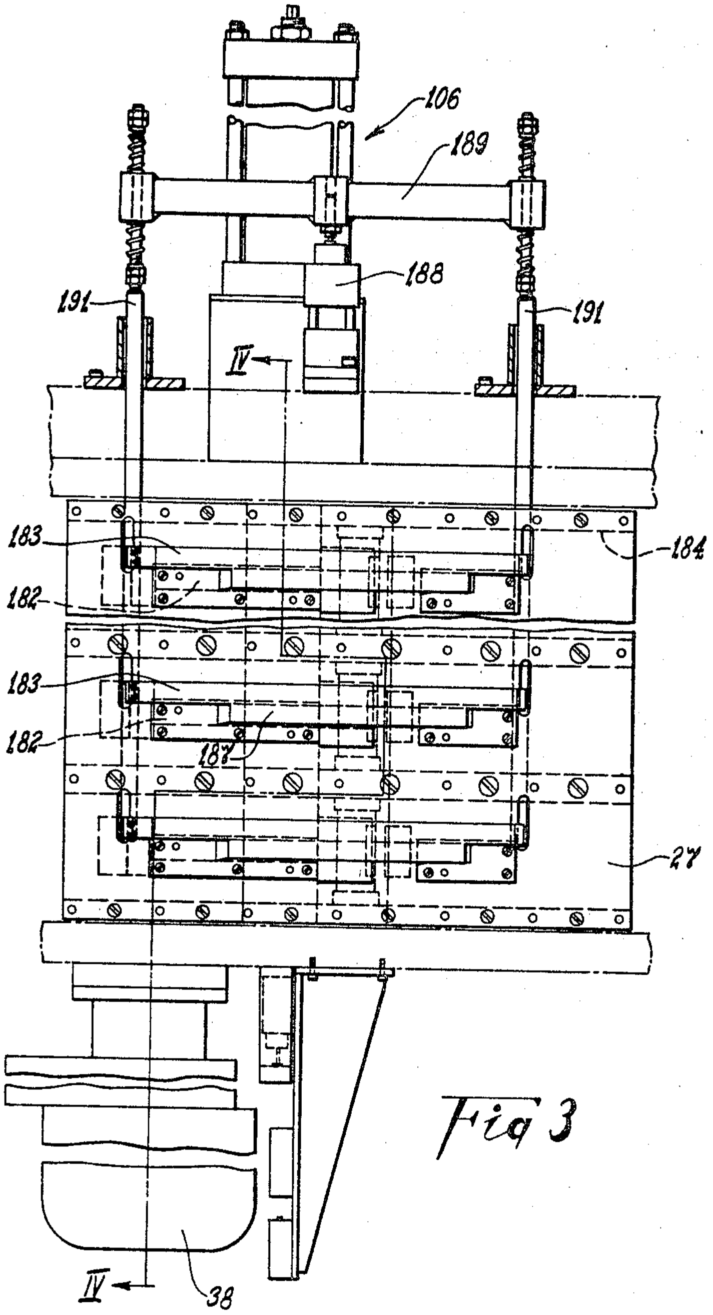
Figure 4:
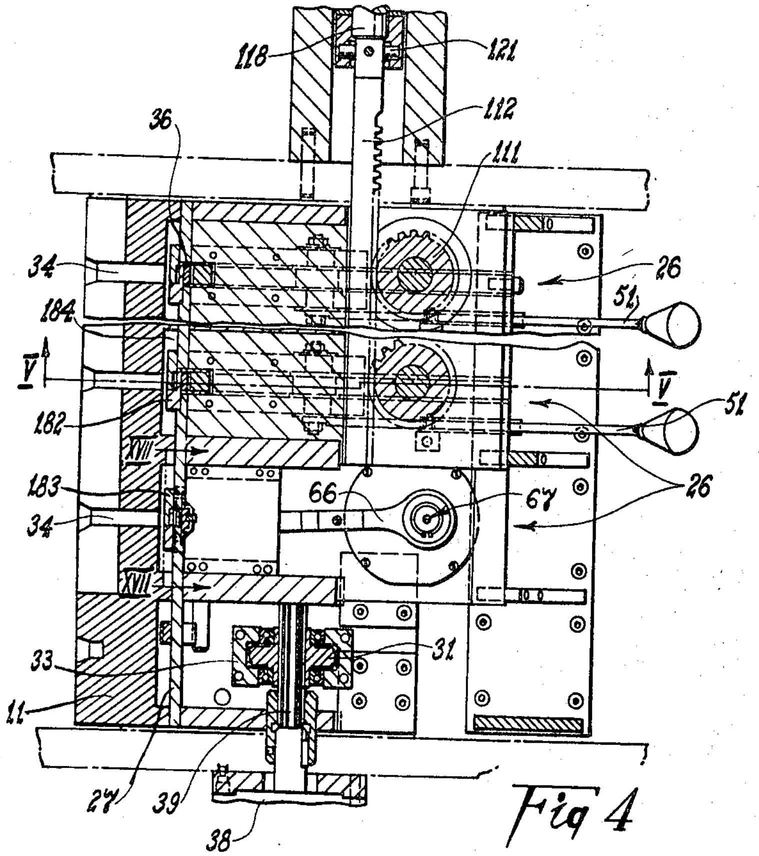
Figure 6:
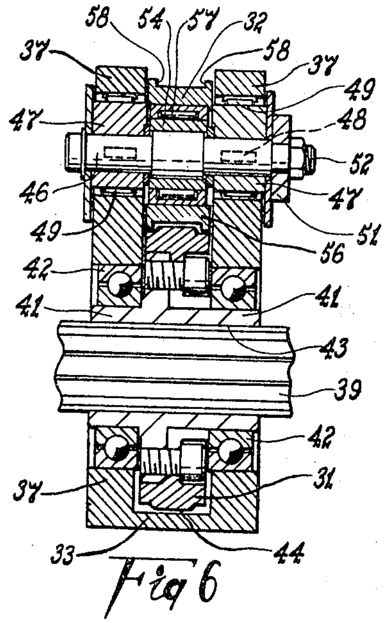
Figure 5:
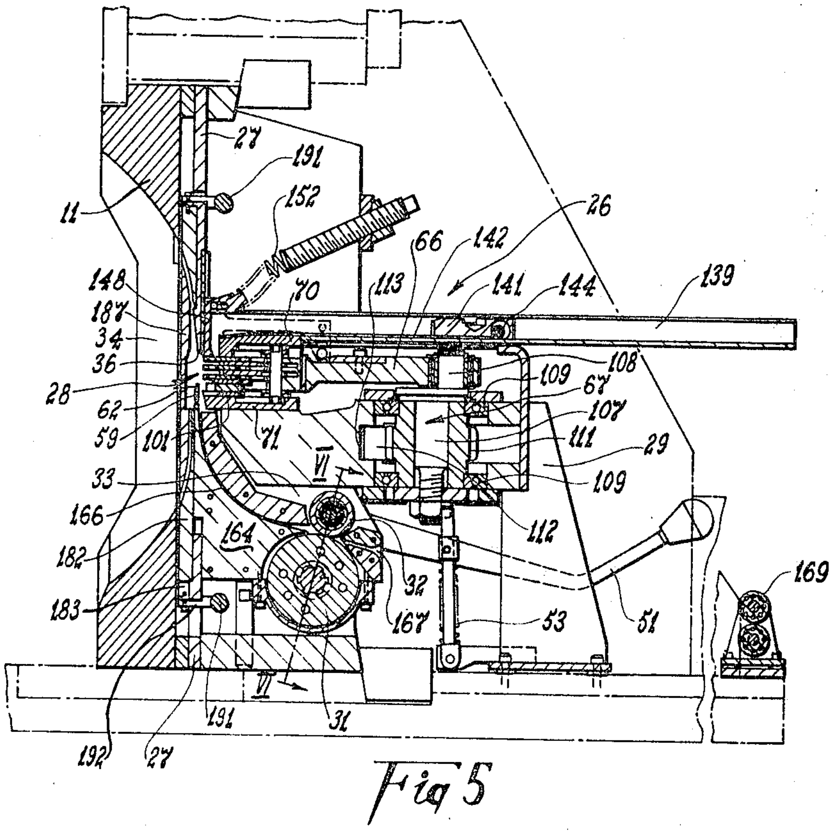
Figure 17:
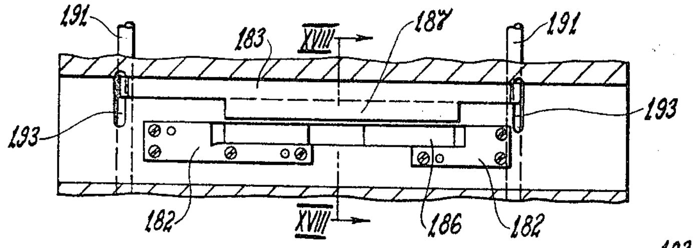
Figure 7:
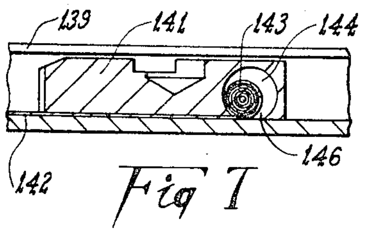
Figure 18:
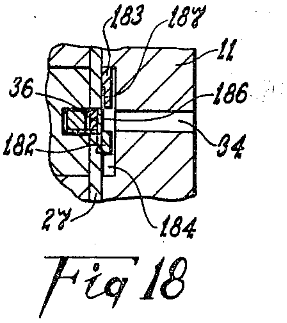
Figure 8:
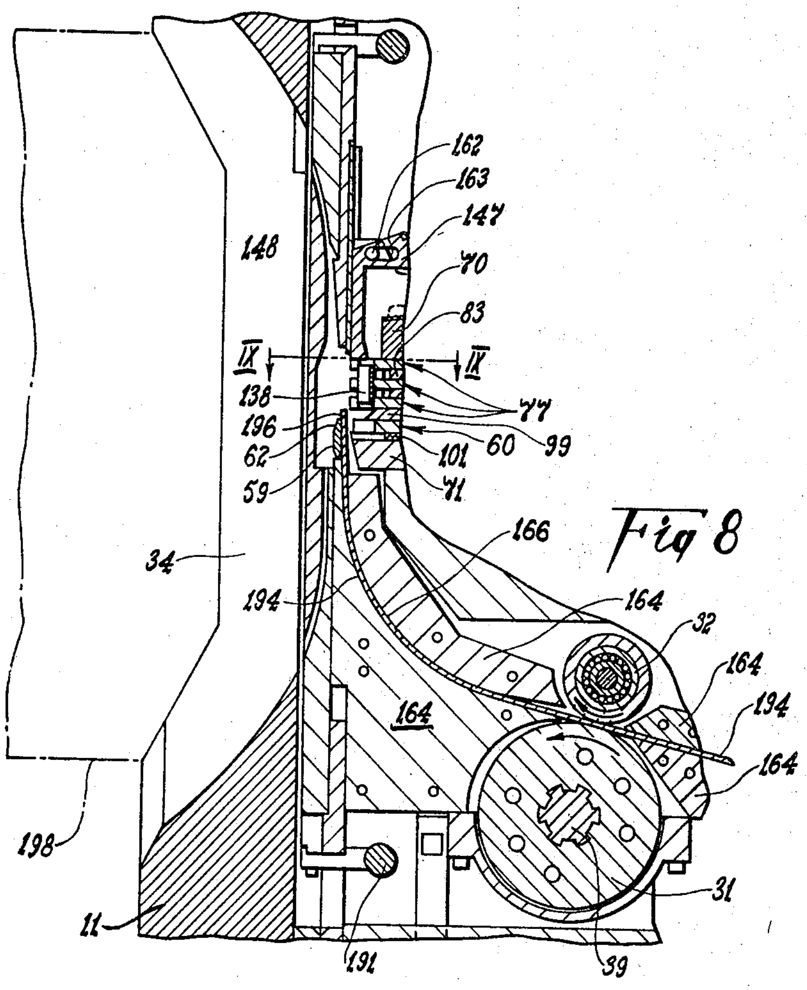
Figure 9:
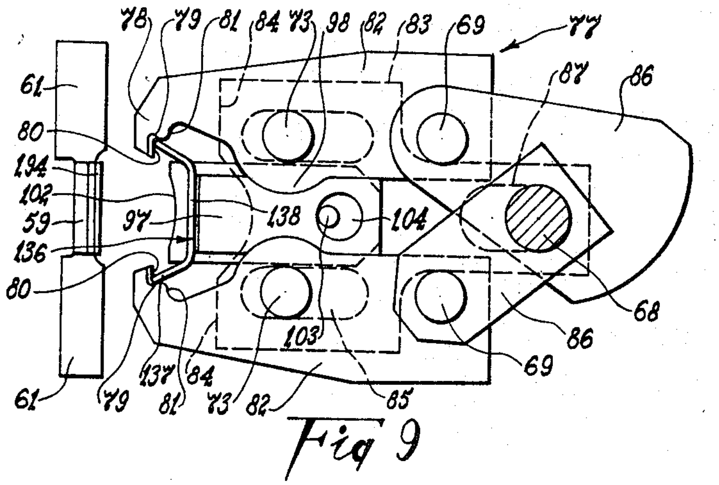
Figure 10:
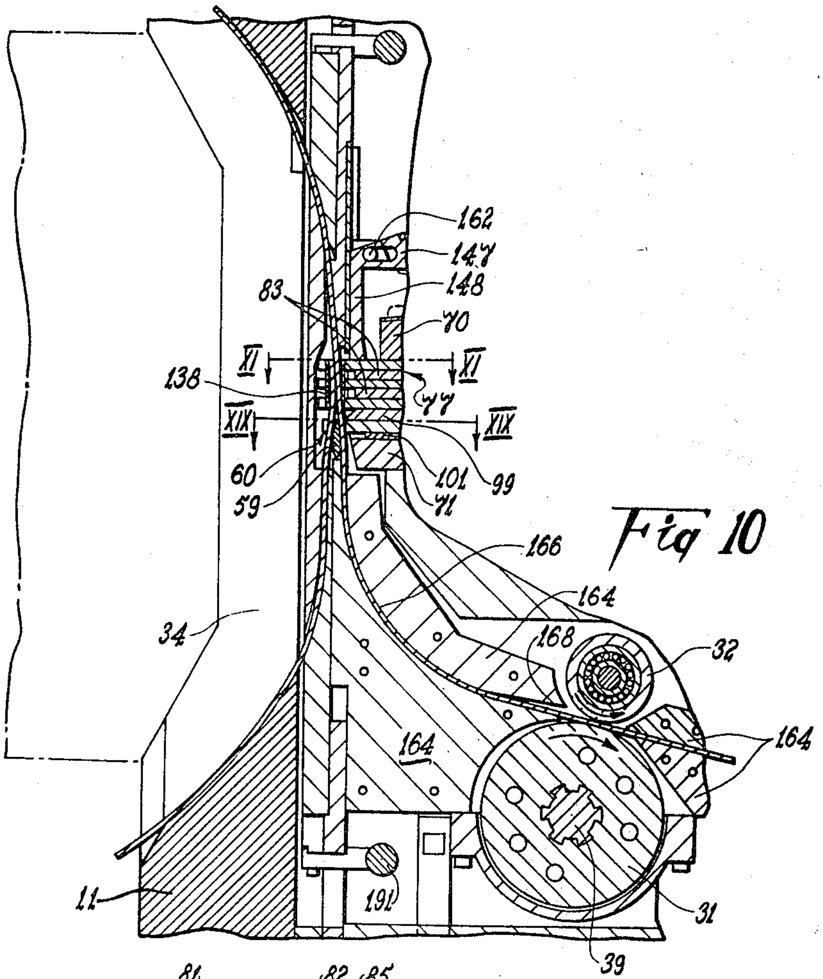
Figure 11:
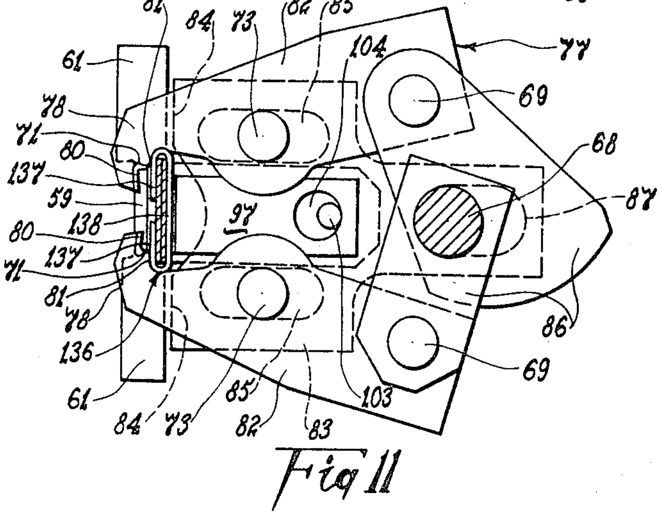
Figures 12, 13:
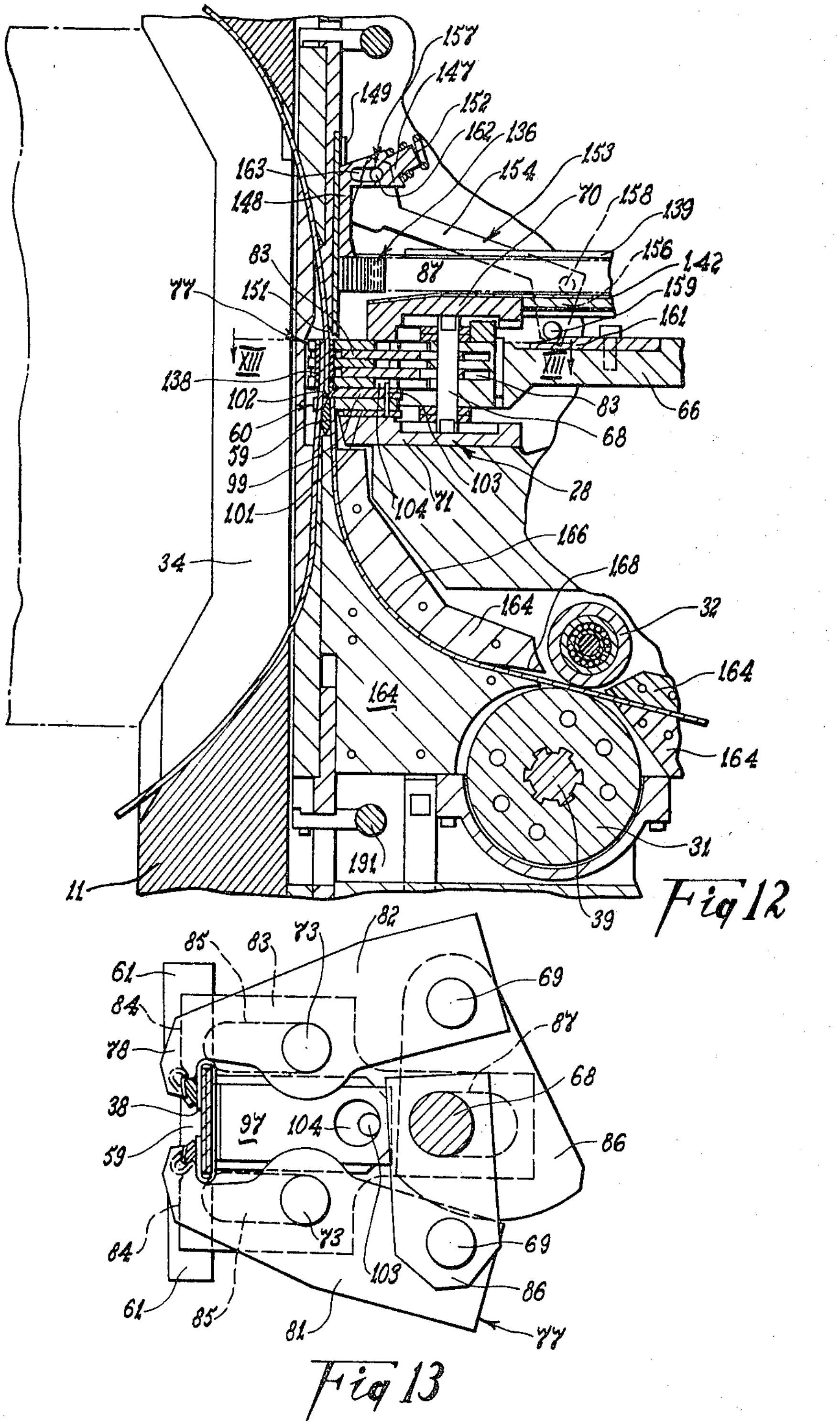
Figure 14:
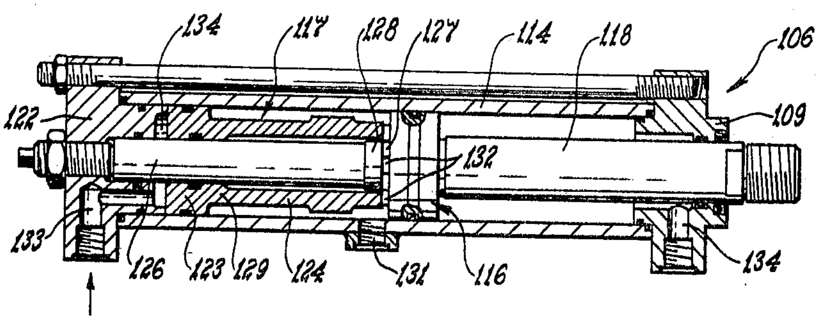
Figure 15:
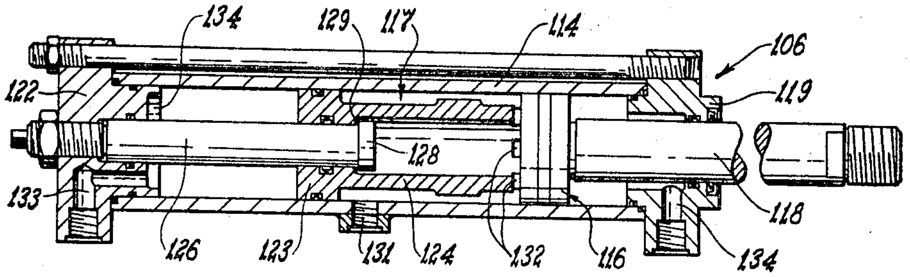
Figure 16:
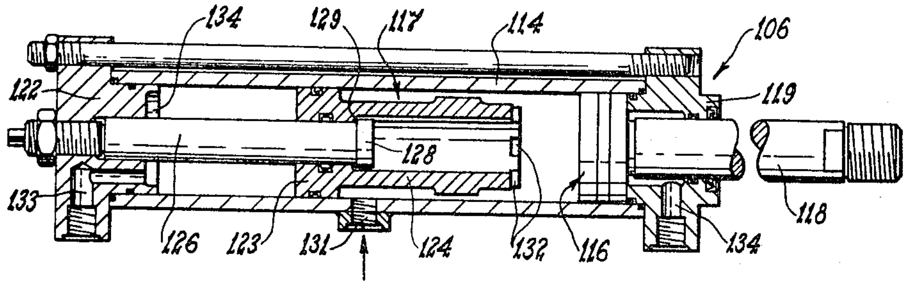
Figure 19:
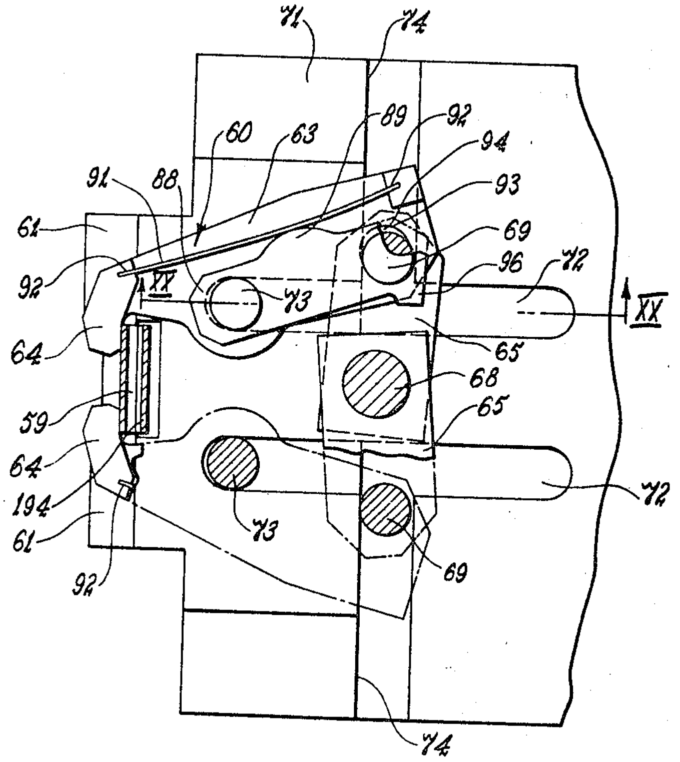
Figure 20:
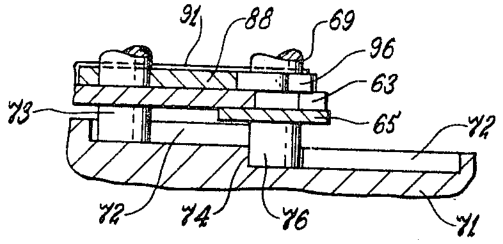

In order that the invention will be readily understood a preferred practical embodiment thereof will be hereinafter described with reference to the accompanying drawings in which:

FIGURE 1 is a side elevational view, part section for convenience of illustration of a typical press incorporating the apparatus of the present invention, FIGURE 2 is a sectional view taken along line II—II of FIGURE 1, FIGURE 3 is a sectional view on an enlarged scale taken along line III—III of FIGURE 1, and rotated to 90° for convenience of illustration, FIGURE 4 is a sectional view taken along line IV—IV of FIGURE 3, FIGURE 5 is a sectional view taken along line V—V of FIGURE 4, FIGURE 6 is an enlarged sectional view taken along line VI—VI of FIGURE 5, FIGURE 7 is an enlarged view of part of the seal blank feeder shown in FIGURE 5, FIGURE 8 is an enlarged sectional elevation of the feeding and tensioning means and part of the sealing head, showing a strap being fed past the sealing head towards the guide grooves of the various press plattens, FIGURE 9 is a sectional view taken along line IX—IX of FIGURE 8, FIGURE 10 is a view similar to FIGURE 8 but showing the strap after it has been fed completely about a bundle, and in which view the sealing head has completed the first stage operation and the feeding and tensioning means is functioning to tension the strap about the bundle, FIGURE 11 is a sectional view taken along line XI—XI of FIGURE 10, FIGURE 12 is a view similar to FIGURE 10 but showing the sealing head at the end of the second stage operation and the clip blank feeder in a position to feed a further seal blank into the sealing head, FIGURE 13 is a sectional view take along line XIII—XIII of FIGURE 12, FIGURE 14 is a sectional view of part of the sealing head operating mechanism before commencement of the first stage operation, FIGURE 15 is a view similar to FIGURE 14 but showing the mechanism at the end of the first stage operation prior to commencement of the second stage operation, FIGURE 16 is a view similar to FIGURE 15 but showing the mechanism at the end of the second stage operation, FIGURE 17 is a view taken along lines XVII—XVII of FIGURE 4, FIGURE 18 is a sectional view taken along line XVIII—XVIII of FIGURE 17, FIGURE 19 is a sectional view taken along line XIX—XIX of FIGURE 10, parts being broken away for convenience of illustration, and FIGURE 20 is a sectional view taken along line XX—XX of FIGURE 19.

The description which follows mentions essential and optional features of the invention and uses reference numerals to refer to these features as illustrated in the form of a preferred embodiment shown in the drawings.

A typical high density press to which the apparatus of the invention is applicable will now be described. Although that press is described as being mounted upright, it will be understood that the same press could be operated with equal effectiveness while lying on its side for example. Thus, the relative terms "upper" and "lower," or words of similar import, as used throughout this specification are to be understood as having their normal meaning only in relation to an upright press. The apparatus of the invention might conceivably be arranged on its side under other conditions, in which case the terms "upper" and "lower" as used in relation to that apparatus will not be applicable.

In addition, reference to a bundle throughout this specification is to be understood as embracing a package, bale, or similar article.

The typical press is illustrated in FIGURES 1 and 2 of the drawings and includes an upstanding main frame 2 which straddles a stationary bed or base platten 3, and supports an upper primary platten 4 for substantially vertical movement towards and away from the base platten 3. The base platten 3 may be supported above ground level by a sub-frame, or part of the main frame, which will be hereinafter referred to as the bed frame 6. The primary platten 4 is preferably hydraulically actuated by a primary cylinder-ram assembly 7 and is guided by any suitable means to remain in substantial alignment with the base platten 3. Both the base and primary plattens 3 and 4 respectively are preferably of substantially square or rectangular shape in plan view.

A secondary cylinder-ram assembly 8 is mounted on a sideward extension of the bed frame 6, and a secondary platten 9 is attached to an end of the ram rod projecting out of the cylinder. In the retracted position of the ram, the secondary platten 9 is located adjacent one side of the base platten 3. Upon introduction of hydraulic fluid into the secondary cylinder, the secondary platten 9 is pushed by the ram across the surface of the base platten 3 towards a backing platten 11 which is fixed to the frame 2 adjacent the opposite side of the bed platten 3.

The arrangement is such that a bale 12 located within the press undergoes vertical compression between the base platten 3 and the primary platten 4, and the primary platten 4 is stopped at a predetermined position. The secondary platten 9 then enters between the base platten 3 and the primary platten 4 and compresses the bale horizontally between it and the backing platten 11.

The bale engaging surfaces of both the secondary platten 9 and backing platten 11 preferably have an inwardly projecting shoulder provided along their upper and lower edge portions. The shoulders of each platten slope inwardly and away from each other and tend to prevent parts of the bale 12 from passing above or below the secondary and backing plattens 9 and 11 respectively during horizontal compression.

A pair of doors are attached to the main frame 2 to cooperate with the plattens so as to define an enclosed bale compression chamber. The two doors form inlet and outlet doors 13 and 14 respectively (see FIGURE 2).

The inlet door 13 is preferably hinged about a substantially horizontal axis 16 located adjacent its lower edge, and is adapted to be moved between an open position and a closed position by a hydraulic piston-cylinder assembly 17. Suitable stop means may be provided for supporting the inlet door 13 in the open position, in which position the inner surface of the door may form a sloping ramp down which an uncompressed bale can slide for location within the press.

The outlet door 14 is preferably slidably mounted on the main frame 2 for substantially vertical movement between an open position in which it is raised above the upper edges of the secondary and backing plattens 9 and 11 respectively, and a closed position in which it is lowered to extend between adjacent edges of the primary platten 4 and the base platten 3 when a bale 12 has been compressed vertically between those plattens. A hydraulic piston-cylinder assembly 18 is preferably utilised to control the movement of the outlet door 14.

. Although a compressed and strapped bale can be removed from the press by hand, it is preferred to provide automatic bale ejecting means. In one form, such means includes a hydraulic piston-cylinder assembly 19 attached to the outer surface of the inlet door 13, and having an end of the piston rod 21 projecting out of the cylinder 22 and into an aperture (not shown) through the outer and inner surfaces of the door 13. A pusher pad 23 is attached to the projecting end of the piston rod 22 and is adapted to engage an end face of a compressed and strapped bale and push that bale through the outlet door opening upon actuation of the ejector piston-cylinder assembly 19.

A downwardly sloping ejection ramp or slide 24 may extend from the outlet door opening to direct the ejected bale on to a conveyor or any other appropriate form of removal means.

The strapping apparatus according to the present invention includes a main assembly 26 which is preferably attached to the backing platten 11 of the previously described typical press (see FIGURE 5). It is generally necessary to use a plurality of straps for tying a compressed wool bale, and a separate main assembly 26 is provided for each strap. In an example case, there are five straps and consequently five strapping assemblies.

The straps may be metal, rayon, nylon, polypropylene or other non-metallic flexible material, and are preferably provided in long lengths formed into coils or reels for convenient storage and use. For convenience however, the straps will be hereinafter described as being made from metal. Each of the five coils or reels to be used with the present apparatus may be contained within the same or separate rotatable dispenser (not shown). The dispenser or dispensers may be mounted on or in close proximity to the previously described typical press for rotation about a substantially horizontal axis.

In a preferred arrangement, the assemblies 26 are mounted side by side (see FIGURE 4) on a common base plate 27 which is attached to the outer surface of the backing platten 11. Each assembly 26 preferably includes, combined feeding and tensioning means, means for gripping the leading end portion of a strap, means for crimping a seal blank about overlapping portions of a strap, strap severing means, and a seal blank storage and feeding device.

According to the embodiment hereinafter described, the gripping means, crimping means and severing means combine to form a composite sealing head 28 (see FIGURE 5) and are actuated by the same operating mechanism. It is to be realised however, that those parts need not be so arranged, they could be dissociated from one another for independent actuation.

Each main assembly 26 includes a body portion 29 (FIGURE 5) which may be interconnected with the body portion 29 of an adjacent assembly, or formed independently thereof. It is generally preferable to form all of the body portions 29 as a single unit to simplify manufacture and assembly. For convenience of description however, the body portion 29 of each main assembly 26 will be hereinafter referred to as a separate unit.

Referring in particular to FIGURES 5 and 6, the combined feeding and tensioning means includes a feed wheel 31 and a back-up wheel 32 which are preferably mounted on a supporting bracket 33 for rotation about substantially horizontal axes, with the back-up wheel 32 located above the feed wheel 31. The aforementioned relative disposition of those wheels is given by way of example only, and can of course vary according to requirements or relative location of the strap dispenser.

A number of elongated and substantially vertically extending openings 34 are provided through the backing platten 11 and corresponding openings 36 are formed through the main assembly base plate 27. Each opening 36 cooperates with a separate one of the openings 34 in the backing platten 11 to provide an access to the bale compression chamber for a separate one of the straps.

The supporting bracket 33 of each assembly 26 is attached to the base plate 27 or body portion 29 of the main assembly 26 so that both the feed wheel 31 and back-up wheel 32 are located beneath the lower end of the associated access opening. In addition, the peripheral surfaces of the wheels 31 and 32 form strap engaging surfaces, and the wheels are preferably mounted between a pair of laterally spaced side flanges 37 (see FIGURE 6) of the supporting bracket 33 to have those surfaces in substantial alignment with the strap access opening.

Means for rotating the feed wheel 31 may include a reversible drive motor 38 (see FIGURES 3 and 4) which is operatively connected to a drive spindle 39. The one drive spindle 39 is preferably common to the feed wheels 31 of all of the assemblies 26, and may be splined to drivably engage the feed wheels 31, but any other appropriate means may be adopted for connecting the drive spindle 39 and feed wheels 31 against relative rotation.

In one form as shown in FIGURE 6, the feed wheel 31 has a cylindrical boss portion 41 projecting axially from each side thereof which is journalled within separate side flanges 37 of the supporting bracket. Preferably, ball or roller bearings 42 are used to journal the boss portions 41 within the side flanges 37. A splined bore 43, complementary with the spline of the drive spindle 39, is provided through the feed wheel 31. In addition, the peripheral surface of the wheel 31, or an intermediate raised portion 44 thereof, is knurled or otherwise provided with some means for obtaining substantially non-slip engagement with the surface of a strap to be fed by that wheel.

The back-up wheel 32 is preferably mounted within the supporting bracket 33 in such a manner that the peripheral surface thereof can be moved towards or away from the peripheral surface of the feed wheel 31, and force applying means is provided to normally urge the peripheral surface of the back-up wheel 32 towards that surface of the feed wheel 31. A preferred mounting for the back-up wheel 32 includes a shaft 46 extending axially through the wheel 32 and having an eccentric 47 secured thereto on each side of the wheel 32. The eccentrics 47 may be secured to the shaft 46 against relative rotation by means of keys 48 or any other appropriate fastening devices.

Each eccentric 47 is rotatably mounted, by means of needle or roller bearings 49 for example, within a separate side flange 37 of the supporting bracket 33. One end portion 51 of the shaft 46 may extend axially through and beyond its respective eccentric 47 and side flange 37 for attachment to the force applying means.

One form of such force applying means is shown in FIGURE 5, and includes a control arm 52 having one end portion attached to the extended end portion 51 of the back-up wheel shaft 46 against relative rotation thereto, and the opposite end portion attached by means of a spring 53 or other resilient means to a fixed part of the assembly 26. The spring 53 is arranged to move the control arm 52 so as to turn the back-up wheel shaft 46 and eccentrics 47 in a direction such as to urge the peripheral surface of the back-up wheel 32 towards the peripheral surface of the feed wheel 31.

As shown in FIGURE 6, the back-up wheel 32 may include a cylindrical hub portion 54 which is mounted on the shaft 46 against relative rotation thereto, and a cylindrical rim portion 56 which is rotatably mounted upon the hub portion 54 by roller or needle bearings 57 for example. In the particular form shown, the strap engaging surface of the back-up wheel 32 is recessed to provide two axially spaced and opposed circumferential shoulders 58 which are adapted to locate on opposite sides of the strap engaging surface of the feed wheel 31, and/or the opposite edges of a strap interposed between the wheels 31 and 32. The shoulders 58 tend to minimize lateral shifting of a strap interposed between the wheels 31 and 32.

In one form as shown particularly in FIGURE 19, the strap gripping means includes a pair of gripper jaws 60 and an anvil 59 against which the jaws 60 are adapted to clamp the leading end portion of the strap. The anvil 59 is preferably in the form of a substantially flat metal bar having fastening blocks 61 attached to the opposite ends thereof.

According to a preferred arrangement, the fastening blocks 61 are secured by screws or other fastening elements to an inner surface of the body portion 29 of the assembly 26, or a part attached thereto, so that the anvil 59 extends transversely across the opening 36 through the base plate 27 and adjacent the lower edge thereof. The opposite surfaces of the anvil 59 face inwardly and outwardly respectively.

The fastening blocks 61 support the outer surface of the anvil 59 clear of the adjacent surface of the body portion 29, and are spaced laterally a distance greater than the width of a strap to be used with the machine. Thus, the strap is adapted to be passed between the fastening blocks 61 and the opposed surfaces of the anvil 59 and body portion 29.

An upper edge portion 62 of the anvil 59 projects above the upper ends of the fastening blocks 61, and the inner surface of that portion may be chamfered or bevelled for a purpose hereinafter made clear.

The gripper jaws 60 each preferably includes an elongated arm 63 having an integral finger 64 extending laterally from one end portion thereof. The jaws 60 are arranged side by side with their respective fingers 64 extending generally towards each other, and the outer or gripping surface or edge of each finger 64 is preferably sloped inwardly towards the terminal end thereof for a purpose hereinafter made clear.

The jaws 60 are mounted for movement towards and away from the anvil 59, and for this purpose they are preferably attached to a reciprocatable member located outwardly of the anvil 59 and which forms part of the main assembly 26. The jaws 60 are mounted on that member so that their respective fingers 64 are located adjacent the anvil 59 and the arms 63 extend in a direction generally outwardly away from the anvil 59.

In the preferred embodiment illustrated, the reciprocatable member is in the form of a connecting rod 66 (see FIGURES 4 and 5) having the gripping jaws 60 mounted adjacent one end thereof and having its opposite end portion journalled on a crank shaft 67 which forms part of the sealing head operating mechanism as hereinafter described. The connecting rod 66 is adapted to move the jaws 60 between an inoperative position in which the fingers 64 are located outwardly from the outer surface of the anvil 59; and an operative position in which the jaw arms 63 extend past opposite sides of the upper portion 62 of the anvil 59, and the fingers 64 thereof have their gripping surfaces located inwardly of the inner surface of the anvil 59 and in overlapping relationship to same.

During movement of the jaws 60 from one position to another, the jaw fingers 64 must pass on opposite sides of the upper portion 62 of the anvil 59 before moving towards each other when located inwardly of the inner surface of the anvil 59, and this is accomplished by jaw closing and release mechanism.

According to the arrangement illustrated, the aforementioned mechanism includes a toggle assembly connecting the jaws to the connecting rod 66 and which is influenced by a spring (not shown) or other suitable means to normally urge the jaw fingers 64 laterally away from each other, and camming means which guides the gripper jaws 60 in a longitudinal direction during reciprocation of the connecting rod 66. The camming means is also adapted to direct the jaw fingers 64 towards each other against the action of the toggle spring when the connecting rod has moved the gripper jaws 60 a predetermined distance longitudinally in the inward direction.

Preferably, the toggle assembly includes a pair of toggle arms 65 having one of their end portions pivotally connected together and to the connecting rod 66 by means of a connecting rod pivot pin 68 having its axis extending substantially vertical. The opposite end portion of each toggle arm 65 is pivotally connected by a pivot pin 69 (hereinafter called the toggle pin) to a separate one of the gripper jaw arms 63 adjacent the end thereof which is remote from the jaw finger 64. The axes of the toggle pins 69 preferably extend substantially parallel to the axis of the connecting rod pin 68.

In their normal position, the toggle arms 65 have their outer ends connected to the connecting rod 66, and extend generally inwards at an angle to each other for connection to the outer end portions of the gripper jaw arms 63.

The camming means may include at least one guide block 71 (see FIGURES 12 and 20) secured to the body portion 29 of the main assembly 26, or forming an integral part thereof, and having a pair of laterally spaced and substantially parallel guide slots 72 formed in a surface thereof. The surface containing the guide slots 72 may be substantially horizontal, and the guide slots 72 preferably extend in a direction substantially normal to the outer surface of the anvil 59.

A separate guide pin 73 extends through a hole in each of the gripper jaw arms 63 intermediate the length thereof, and have an end portion slidably located within a separate one of the guide slots 72. Such guide pins 73 also preferably form the main pivot pins for their respective jaw arms 63 and have their axes substantially parallel to those of the toggle and connecting rod pins 69 and 68 respectively.

The guide block 71 may also be provided with a laterally extending striker surface 74 (see FIGURE 20), and a striker pin may be attached to at least one of the toggle arms. In the embodiment illustrated, the striker pin 76 (see FIGURE 20) is formed by an extension of one of the aforementioned toggle pins 69.

The striker surface 74 is positioned to be engaged by the striker pin 76 after the connecting rod 66 has moved the gripper jaws 60 a predetermined distance in the inward direction, thereby causing the inner ends of the toggle arms 65 to move laterally away from each other as the connecting rod 66 continues its inward movement. Such movement of the toggle arms 65 results in the gripper jaw arms 63 being swung about their respective main pivot pins 73 so that the jaw fingers 64 move towards each other.

The seal blank crimping means may include at least one pair of crimping jaws 77 (see FIGURES 8 to 13) which are of generally the same construction as the gripper jaws. The main difference in construction between the two types of jaws is that, in the crimping jaws 77 the outer surface of each jaw finger 78 is stepped as at 79 to provide a resting surface 80 adjacent the terminal end thereof, and a further outwardly disposed crimping surface 81 adjacent the junction of the jaw finger 78 with the jaw arm 82. The steps 79 of the two associated jaws may slope outwardly and towards each other for a reason hereinafter made clear.

In the preferred arrangement illustrated, there are three pair of crimping jaws 77, and each pair is mounted one above the other on top of the gripper jaws 60.

Also, the seal blank crimping means may include one or more notching plates 83, each of which is recessed at the inner end to provide two laterally spaced notching lands 84. The distance between those lands is less than the width of a seal blank to be used with the apparatus of this invention. When there are three pair of crimping jaws 77, it is preferred that two notching plates 83 be provided as shown, one plate 83 between each two adjacent pair of crimping jaws 77.

The gripper jaw closing and release mechanism may be utilised to similarly actuate the crimping jaws 77. Thus, the crimping jaws 77 are attached to an upper pair of toggle arms 86 aligned with and connected to the toggle arms 65, preferably by the same pins 69 as used to connect the gripper jaws 60. Also, the main pivot pins 73 of the gripper jaws 60 are extended to form the main pivot pins of the crimping jaws 77.

It is preferred however, that separate guide blocks 70 and 71 be provided above and below respectively the stack of crimping and gripper jaws 77 and 60 respectively, as shown in FIGURES 5 and 12. Both blocks 70 and 71 may be of substantially the same construction, although the upper block 70 may not extend inwardly as far as the lower block 71 so as to allow space for a seal blank to be fed to the crimping jaws 77. Also, it is generally only necessary to provide one striker pin 76 which is arranged to engage the striker surface 74 on the lower block 71.

With the seal blank crimping means illustrated the connecting rod pivot pin 68 and the two main pivot pins 73 extend through apertures formed through each notching plate 83. Such apertures are in the form of slots 85 and 87 extending in substantially the same direction as that of the guide slots 72 in the guide block 71. The connecting rod pin slot 87 may be of predetermined length so that the connecting rod pin 68 engages an inner end thereof after the connecting rod has moved a predetermined distance in the inward direction, as shown in FIGURE 11.

For reasons hereinafter made clear, the crimping jaws 77 preferably close in two stages, and the gripper jaws 60 must be finally closed at the end of the first stage. Thus, since the same jaw closing and release mechanism is employed for both sets of jaws, it is preferred to provide each arm 63 of the gripper jaws 60 with a lost motion device which becomes operable when the crimping jaws 77 enter into the second stage of their closing movement.

A preferred form of lost motion device is illustrated in FIGURE 19, and includes a cam bar 88 overlying a portion of its associated gripping jaw arm 63 and having opposite end portions thereof pivotally connected to the main pivot pin 73 and toggle pin 69 respectively. A cam surface 89 is provided along the longitudinal edge of the cam bar 88 which is remote from the cam bar 88 of the adjacent gripper jaw arm 63. The cam surface 89 of each cam bar 88 is in constant engagement with an elongated leaf spring 91 for example, which extends in the same general direction as the cam bar 88 and has opposite end portions thereof slidably located within retaining slots 92 formed in an integral part of the jaw arm 63, or a part secured to that arm. The springs 91 preferably rest upon a substantially flat surface of their respective jaw arms 63 so that bending movement thereof is not substantially impaired.

As a further part of the lost motion device, the hole 93 in each gripper jaw arm 63 through which the toggle pin 69 passes is of a size such as to allow a limited amount of lateral movement of the toggle pin 69 relative to that arm 63. Each spring 91 is adapted to cause a reaction between its respective cam bar 88 and jaw arm 63 through the intermediary of the toggle pin 69, such that the toggle pin 69 normally engages the surface of the clearance hole 93 which is remote from the associated spring 91. This leaves a clearance space 94 on the other side of each toggle pin 69 to allow a limited amount of lateral movement of the outer ends 96 of the two cam bars 88 away from each other without causing similar movement of the outer ends of the gripper jaw arms 63. However, it is necessary for the cam engaging springs 91 to yield in order to achieve such lost motion.

The strength of the cam engaging springs 91 is predetermined to provide adequate bearing pressure between the gripper jaw fingers 64 and a portion of strap interposed between those fingers and the inner surface of the anvil 59, to substantially prevent slipping of the strap relative to the anvil 59 when the apparatus functions to tension a length of strap around a bale.

The seal blank crimping means also preferably includes a blank retainer for holding a seal blank in place against a strap portion during crimping. Such a retainer may include one or more pressure bars 97 for locating against the outer surface of a seal blank and holding that blank firmly against portion of the strap as it is being crimped thereabout. Preferably, there is one such pressure bar 97 located between the arms 82 of each pair of crimping jaws.

In one form, each pressure bar 97 is urged into firm engagement with the seal blank by its associated pair of jaw arms 82. The connection between the pressure bar and jaw arms may include an arcuate recess formed in each side of the bar 97 intermediate its ends, and a substantially complementary arcuate projection 98 on each jaw arm 82 which engages within the recess in the adjacent side of the pressure bar 97. Each arcuate projection 98 is formed about the axis of its respective main pivot pin 73 and has a greater arcuate length than the corresponding recesses so as to allow a limited amount of rolling movement of the projection 98 within their respective recesses.

The strap severing means preferably includes a cutter plate 99 adapted to be actuated by movement of the crimping jaws 77. In one form as shown in FIGURE 12, the cutter plate 99 is secured to a slider block 101 slidably mounted in a track formed in the lower guide block 71, and which track extends in substantially the same direction as the guide slots 72 of that block. A cutting edge 102 is formed on the inner edge of the cutter plate 99, and the cutter plate 99 is mounted on the slider block 101 so that the cutting edge 102 thereof is adapted to be moved over and past the upper edge of the anvil 59. The arrangement is such that the anvil 59 cooperates with the cutter plate 99 to form a stationary cutter blade, and the cutting edge 102 of the cutter plate 99 may be curved or otherwise shaped to obtain an effective cutting action.

The operative connection between the cutter plate 99 and the crimping jaws 77 may include an actuator pin 103 which is secured to the cutter plate 99 or slider block 101 to project substantially vertically through a clearance hole 104 in the nearest pressure bar 97. The size of the clearance hole 104 is predetermined so that the outermost side wall thereof engages the actuator pin 103 as shown in FIGURES 12 and 13 to drive the cutter plate 99 into a cutting position at an appropriate time during inward movement of the crimping jaws 77.

The preferred sealing head operating mechanism illustrated, includes the aforementioned crank shaft 67 which is caused to oscillate by a two-stage piston-cylinder assembly 106 (FIGURES 14 to 16). A separate crank shaft 67 is provided for each main assembly 26 of the apparatus, whereas the same piston-cylinder assembly 106 may actuate each one of those crank shafts 67.

As shown in FIGURE 5, each shaft 67 includes a substantially vertically extending spindle portion 107 which is journalled in the body portion 29 of the respective main assembly 26, and a crank portion 108 projecting from one end of the spindle portion 107 and journalled in an end portion of the connecting rod 66.

Any appropriate operative connection may be provided between the piston-cylinder assembly 106 and the crank shaft 67. It is preferred however, that a rack and pinion connection be employed as shown in FIGURES 4 and 5. With such an arrangement, the spindle portion 107 of each crank shaft may extend through an enlarged bore in the body portion 29 of its respective main assembly 26, and is oscillatably mounted within the bore by two vertically spaced roller or ball bearings 109 for example. A pinion gear 111 is secured to the spindle portion 107 against relative rotation intermediate the bearings 109 and is drivably engaged by an elongated rack 112 extending laterally through each main assembly 26. The rack 112 is slidably mounted in a channel 113 formed within each body portion 29.

The two-stage piston-cylinder assembly 106 as shown in FIGURES 14 to 16 includes an elongated cylinder 114 containing a primary piston 116 and a secondary piston 117. The primary piston 116 is secured to one end of a piston rod 118 which passes through, and is slidably mounted within, one end wall 119 of the cylinder 114. The end of the piston rod 118 remote from the primary piston is attached to an end of the rack 112 by a universal joint 121 (see FIGURE 4) or any other appropriate means. Any suitable device such as an O-ring for example, may be provided within the end wall 119 to form a substantially fluid tight seal against the surface of the piston rod 118.

The secondary piston 117 is located between the primary piston 116 and the end wall 122 of the cylinder 114 remote from the rack 112, and in the form shown includes a head portion 123 and an axially extending sleeve portion 124 which is of smaller diameter than the head portion 123. The secondary piston 117 is disposed within the cylinder 114 with the head portion 123 thereof remote from the primary piston 116, and is slidably mounted on a stationary piston rod 126 secured to the end wall 122 of the cylinder 114.

In the fully retracted position of both pistons 116 and 117 as shown in FIGURE 14, they are in end to end abutment with the secondary piston 117 also abutting the end wall 122. Also in this position, a space 127 exists between the terminal end of the stationary piston rod 126 and the adjacent face of the primary piston 116.

Movement of the secondary piston 117 along the stationary piston rod 126 towards the end wall 119 is limited by any suitable stop means. In the form shown, such stop means includes an enlarged boss 128 formed on the terminal end portion of the stationary piston rod 126, and an annular shoulder 129 formed by a step in the bore of the sleeve portion 124, which shoulder 129 is adapted to engage an end of the enlarged boss 128.

A primary fluid inlet 131 is provided through the side wall of the cylinder 144 in a position located intermediate the primary piston 116 and the head portion 123 of the secondary piston 117 when both pistons are in the fully retracted position. Radial slots 132 are formed in the terminal end surface of the sleeve portion 124 of the secondary piston 117 to enable hydraulic fluid to contact a major part of the adjacent face of the primary piston 116 when that piston and the sleeve portion 124 are abutting as shown in FIGURE 14.

The positions of the secondary piston stop means and the primary fluid inlet 131 are predetermined so that the head portion 123 of the secondary piston 117 does not at any stage cover the primary fluid inlet 131.

A secondary fluid inlet 133 is formed through the end wall 122 of the cylinder, and opens into a recess 134 within that the wall which enables fluid to contact a major part of the adjacent face of the secondary piston 117 when that piston abuts the end wall 122 as shown in FIGURE 14.

A reversing fluid inlet 134 is formed through the end wall 119 of the cylinder so as to enable entry of fluid into the cylinder 114 for urging both pistons 116 and 117 into their fully retracted positions as hereinafter described.

The length of stroke of both pistons 116 and 117 is predetermined to give the desired two-stage movement to the crimping jaws 77.

As previously mentioned, each main assembly 26 also preferably includes a seal blank feeder. In one form as shown in FIGURE 9, each seal blank 136 is formed of metal plate and is of substantially channel shape in transverse cross section. However, the leg portions 137 of the channel preferably extend from the base portion 138 thereof angularly away from each other.

Referring to FIGURES 5, 7 and 12, each seal blank feeder includes an elongated magazine 139 which extends substantially normal to the base plate 27 of the apparatus and is attached to that plate, or to the body portion 29 of its respective main assembly 26. A platform 141 or any other form of seal blank engaging means is situated within the magazine 139 for sliding movement between the inner and outer ends thereof.

A plurality of seal blanks 136 may be arranged in stacked relationship within the magazine 139 between the inner end thereof and the platform 141. The disposition of each blank 136 within the magazine 139 is such that the leg 137 portions extend inwardly from the base portion 138, and are arranged substantially parallel to the direction of movement of a strap fed by the apparatus.

Any appropriate means may be provided to normally urge the platform 141 towards the inner end of the magazine 139, but it is preferred to employ a coiled spring 142 in strip form for example. One end of the spring 142 may be attached to the magazine 139 or other fixed member adjacent the base plate 27 of the apparatus, and the coiled body 143 of the spring 142 is preferably located within a transverse cylindrical cavity 144 formed in the platform 141. The spring 142 projects out of the cavity 144 through an aperture 146 formed in the platform 141 so that the length thereof intermediate the coiled body 143 and the fixed end portion extends along a longitudinal wall, preferably the lower wall, of the magazine 139. With such an arrangement, a substantially constant driving force is applied to the platform 141 irrespective of its position along the length of the magazine 139, thereby substantially avoiding jamming of seal blanks 136 within the magazine 139.

A seal blank ejector is provided adjacent the inner end of the magazine 139, and in a preferred form includes an ejector body 147 located externally of the magazine 139 and having a substantially flat ejector tongue 148 projecting therefrom and slidably mounted for substantially vertical movement in a channelled slide plate 149. The slide plate 149 extends between the inner end of the magazine 139 and the base plate 27 of the apparatus so that its lower end 151 terminates in a zone adjacent the upper surface of the uppermost pair of crimping jaws 77. The ejector tongue 148 is adapted to slide downwards along the channel of the slide plate 149 a distance such that, at the extent of its downward movement, the lower end thereof is substantially coterminous with the lower end 151 of the slide plate 149.

Ejector actuating means preferably includes a helical spring 152 which extends between the ejector body 147 and a stationary part of the apparatus so as to normally urge the ejector in a downward direction, and a cam operated bell-crank lever 153 for controlling the movement of the ejector. The helical spring 152 is also arranged to maintain the ejector tongue 148 in engagement with the base of the slide plate channel during its movement along that channel.

The bell-crank lever 153 has a major arm 154 and a minor arm 156 which extend angularly to each other. The major arm 154 preferably extends in the same general direction as the magazine 139 and is pivotally connected at 157 and 158 respectively to the ejector body 147 and a stationary part of the apparatus such as the magazine 139 for example. The minor arm 156 extends in a generally downward direction from the outer end portion of the major arm 154 and has a cam follower 159 attached adjacent its terminal or lower end.

A cam plate 161 is attached to the connecting rod 66 of the sealing head 28 to engage the cam follower 159, which is preferably a roller, during reciprocal movement of the connecting rod 66. Since the tongue 148 slides in a substantially straight path and the adjacent end of the bell-crank lever 153 swings through an arc, a lost motion connection is provided between those two members. Preferably, this is taken care of by a pin 162 attached to the bell-crank lever 153 which slidably engages within an elongated slot 163 formed within the ejector body 147. The slot 163 may extend in a direction substantially normal to the direction of movement of the ejector tongue 148.

The apparatus also preferably includes strap guides. In each main assembly 26, the guides may take the form of contoured plates or blocks 164 as shown in FIGURES 8, 10 and 12 secured between the side flanges 37 of the supporting bracket 33, and a separate set of such guide blocks 164 is preferably located on the inner and outer sides of the feed and back-up wheels 31 and 32 respectively.

In each set of the main assembly guides 164, the plates or blocks cooperate to form a relatively narrow passage 166 through which a strap can slide with minimum buckling and consequent jamming. The outer end portion of the guide passage 166 of the outer set is preferably flared to form an entrance mouth 167 (FIGURE 5) to facilitate feeding of a strap end into that passage. The guide passage 166 of the inner set may have a similarly flared entrance mouth 168 adjacent the feed and back-up wheels 31 and 32 respectively, and curves upwardly from those wheels to terminate adjacent the lower end of the anvil 59 with its inner surface substantially aligned with the outer surface of the anvil 59.

Other guides, for example in the form of pairs of rollers 169 as shown in FIGURE 5, or single rollers according to requirements, may be provided outwardly of each main assembly 26 to guide a strap section extending between that assembly and the strap dispenser (not shown).

Preferably, the upper end wall of each strap opening 36 and 34 in the base plate 27 and backing platten 11 respectively, slopes inwardly and upwardly to form guide surfaces which substantially merge at their adjacent ends with the outer surface of an upwardly and inwardly curved guide passage formed in strap release mechanism hereinafter described. The lower end wall of each backing platten strap opening 34 is curved downwardly and inwardly to substantially merge at its outer side with a similarly curved guide passage formed in the aforementioned release mechanism. This last mentioned passage preferably has its outer surface in substantial alignment with the inner surface of the anvil 59.

The primary, secondary and base plattens 4, 9 and 3 respectively may each be provided with an appropriate number of guide grooves for the straps.

According to the illustrated embodiment, the guide grooves 171 (see FIGURES 1 and 2) of the primary platten 4 have a substantially flat base, and curved strap guides are provided within each of the grooves 171 adjacent the backing platten 11 to substantially merge with the upper guide surfaces of the backing platten 11. Such a curved strap guide preferably comprises a flexible strip 172 of spring steel for example, clamped at the end adjacent the backing platten 11 and having its upper surface engaging a roller 173 or other support adjacent to its other end.

The guide grooves 174 of the secondary platten 9 may have an appropriately curved base 176 (see FIGURE 1) to substantially merge with the guide strips 172 of the primary platten 4 when both plattens are positioned with a fully compressed bale in the bale compression chamber. However, it is preferred that curved guide fingers 177 and 178 extend from the upper and lower edges respectively of the secondary platten 9 to form continuations of the guide groove bases 176, and which fingers slidably locate within the respective guide grooves of the primary and base plattens 4 and 3 respectively. Such fingers 177 and 178 ensure effective overlapping of the guide surfaces of the primary, secondary and base plattens.

As for the primary platten, the grooves 179 of the base platten 3 may have a substantially flat base, and an upwardly and outwardly curved ramp 181 may be provided within each groove 179 adjacent the backing platten 11. The surface of each ramp 181 substantially merges with one of the lower guide surfaces of the backing platten 11.

Strap release mechanism is provided adjacent each sealing head 28 to release the sealed straps from the apparatus and allow a strapped bale to be ejected from the press. Such mechanism is preferably as shown in FIGURES 3, 4, 17 and 18, and includes a stationary bar 182 and a slidable shutter bar 183 for each main assembly. In the arrangement shown, both bars 182 and 183 are located in a substantially vertically extending and channel shaped shutter groove 184 formed within the outer surface of the backing platten 11, and which has the strap opening 36 of the plate 27 passing through its base.

The two bars 182 and 183 of each assembly extend longitudinally of their respective shutter groove 184 in side by side relationship, and the stationary bar 182 is preferably secured to the base plate 27 so as to be interposed between the strap openings 36 and 34 of the base plate and the backing platten respectively. A recess 186 is formed in a side edge portion of the stationary bar 182 to interconnect the openings 36 and 34, and the upper end wall of that recess is preferably curved or otherwise shaped to form a continuation of the adjacent guide surfaces of the base plate 27 and backing platten 11. The lower end wall of the recess 186 may be curved or otherwise shaped to form a continuation of the lower guide surface of the backing platten 11, and preferably terminates adjacent the lower edge of the inner surface of the anvil 59.

In one form, each shutter bar 183 has a sideward extension 187 which projects into the recess 186 of the associated stationary bar 182 so as to extend across the openings 34 and 36 when the shutter bar 183 is in a closed position as shown in FIGURE 4. The length of the extension 187 and the contour of its outer surface is such that it cooperates with the shaped surfaces of the stationary bar to form the upper and lower strap guide passages hereinbefore referred to. However, it is preferred that the lower end portions of both passages diverge towards their respective lower ends to form enlarged entrance mouths for receiving the leading end of a strap.

With such an arrangement, the shutter bars 182 and 183 are adapted to be moved laterally so that the sideward extension 187 emerges out of the associated stationary bar recess 186 and clears the strap openings 34 and 36 as shown in FIGURES 17 and 18. This movement may be controlled by actuating means in the form of a piston-cylinder assembly 188 (see FIGURE 3) operatively connected to the opposite end portions of each shutter bar 183.

A preferred form of such an operative connection is shown in FIGURE 3, and includes a cross bar 189 attached intermediate its ends to the assembly 188, and a pair of actuating rods 191 attached to the opposite ends respectively of the bar 189 and extending transversely across the outer surface of the apparatus base plate 27. The two actuating rods 191 extend above and below respectively, each main assembly 26 of the apparatus (see FIGURE 5).

A series of transversely spaced connector bars 192 (see FIGURE 5) extend inwardly from each actuating rod 191 and project through transversey extending slots 193 (FIGURE 17) in the apparatus base plate 27 for attachment to adjacent end portions of separate shutter bars 183. Each connector bar 192 may be attached to its respective shutter bar by a screw or other releasable device.

A preferred mechanism for controlling the various operations of the apparatus will be described in the following description of the apparatus when in use.

Initially—when the apparatus is being prepared to strap a first bale, or a fresh reel of strap is being used—a length of strap for each main assembly of the apparatus is withdrawn by hand from the or each dispenser and the leading end thereof is passed over and/or through the various guide rollers 169, through the outer set of guides 164 of the main assembly 26 and between the peripheral surfaces of the feed and back-up wheels 31 and 32 respectively. The back-up wheel 32 can be moved away from the feed wheel 31 manually in order to interpose the leading end portion of a strap therebetween.

Referring now to FIGURE 8, a strap 194 is fed from the wheels 31 and 32 through the guide passage 166 of the main assembly 26 which directs the leading end 196 of the strap 194 over the outer surface of the anvil 59, until the leading end 196 of the strap is substantially coterminous with the upper edge of the anvil 59. After a bale has been strapped and the surrounding lengths of strap severed from the source of supply, the leading end of the next length of strap to be fed by the apparatus will be also located adjacent the upper edge of the anvil 59.

Also, at the commencement of each sequence of operations, the sealing heads 28 are positioned with the gripper and crimping jaws 60 and 77 respectively in their inoperative or outermost position as shown in FIGURE 9. In this position of the jaws, the crimping jaw fingers 78 are located with their resting surfaces 80 in substantial alignment with the base of the ejector slide channel 149. A seal blank 136 is positioned (in a manner hereinafter described) between the crimping jaws 77 with the longitudinal edge portion of each leg portion 137 abutting the sloping steps 79 on the fingers 78 as shown in FIGURE 9. The steps 79 tend to urge the seal blank 136 inwardly so that the longitudinal edges of its leg portions 137 engage the finger resting surfaces 80, and maintain the seal blank 136 substantially in that position during movement of the sealing head 28 between the inoperative and operative positions of the jaws.

An uncompressed bale 12 is fed into the press and compressed vertically between the primary and base plattens 4 and 3 respectively. The secondary platten 9 is then moved into the space between the last mentioned plattens and compresses the partially compressed bale in a horizontal direction. As the secondary platten 9 approaches the end of its movement, the upper guide fingers 177 of that platten contact and bend the flexible guide strips 172 of the primary platten 4 so that they are in overlapping relationship with the upper guide fingers 177. The lower guide fingers 178 of the secondary platten 9 overlap the guide ramps 181 of the base platten 3.

When the secondary platten 9 reaches the end of its inward movement, it causes actuation of a hydraulic shutter closing valve which admits fluid under pressure to the piston-cylinder assembly 188 actuating the shutter bars 183. The piston-cylinder assembly 188 is thereby operated to move the shutter bars 183 into their closed positions as shown in FIGURES 3 and 4.

As a result of this movement of the shutter bars 183, a main control switch is actuated to start the drive motor 38 rotating in a forward direction. Thus, the feed wheels 31 are rotated in a forward direction through their connection with the splined drive spindle 39.

Each feed wheel 31 frictionally engages a surface of a strap 194 because of the pressure applied to the opposite surface of the strap by the associated backup wheel 32. The leading end 196 of each strap is thereby pushed forward to pass beneath its respective sealing head 28 which is located in its outermost position, or the inoperative position of the gripper and crimping jaws 60 and 77 respectively.

Each leading end 196 then strikes the associated guide surface on the apparatus base plate 27 which directs that leading end 196 through the upper guide passage of the strap release mechanism. That passage directs the leading end 196 of the strap into engagement with the upper guide surface of the backing platten 11, from where the leading end 196 is guided by the respective guide surfaces of the primary, secondary and base plattens 4, 9 and 3 respectively to pass around the compressed bale 12.

There is little or no tendency for the leading ends 196 of the straps to move into engagement with an adjacent surface of the compressed bale 12 because of the shape of the various guide passages and surfaces. In particular, the guide passage 166 of each main assembly 26 inner set of guides 164 preferably changes direction from substantially horizontal adjacent its outer end to substantially vertical adjacent its inner end, and the guide surfaces of the four plattens cooperate to form a substantially circular guide path as shown by broken line 197 in FIGURE 1. The compressed bale 12 on the other hand is of substantially rectangular shape in transverse cross-section as shown by broken line 198 in FIGURE 1, and there is a substantial amount of clearance between its surfaces and the adjacent platten guide surfaces.

Each lower guide passage of the strap release mechanism receives the leading end 196 of a strap from the respective guide surface of the backing platten 11 and directs it onto or over the inner surface of the anvil 59 of its main assembly 26. It is preferred however, that just prior to leaving that guide passage the leading end 196 of at least one strap 194 contacts the spring arm of a normally isolated secondary control switch (not shown). Since the strap 194 is metal and is contacting metal parts of the apparatus or press and the secondary control switch, it causes completion of a low voltage circuit through the apparatus.

In an alternative arrangement, a magnetic proximity switch may be employed as the secondary control switch. Such an arrangement avoids the possibility of the switch shorting through a "build up" of metallic dust as might occur in the case of a direct contact switch.

A braking switch and an electrically actuated hydraulic valve may be operated by completion of that low voltage circuit. However, it will be appreciated that any other appropriate form of timing device could be used to actuate that switch and valve at the correct moment.

Operation of the braking switch causes braking of the drive motor 38 with the result that rotation of the feed wheels 31 stops. The position of the secondary control switch is predetermined so that forward movement of the straps 194 ceases as the leading end 196 of each strap is positioned a suitable distance above the uppermost pair of crimping jaws of the associated sealing head. In this position which is shown in FIGURE 10, a trailing portion of strap 194 is disposed between the leading end portion 196 and the sealing head 28.

Operation of the electrically actuated hydraulic valve may be delayed a predetermined period of time after completion of the secondary control switch circuit, by means of a conventional slugged relay. That valve forms the first stage valve for the sealing head 28 and, when operated, admits fluid under pressure to the cylinder 114 of the sealing head operating mechanism through the secondary fluid inlet 133.

Thus, the secondary piston 117 is moved towards the end wall 119 of the cylinder, and because of its abutment with the primary piston 116, the primary piston 116 is moved in the same direction. As a result, the elongated rack 112 is pushed longitudinally through the main assemblies 26 of the apparatus and thereby causes partial rotation of the engaging pinion gears 111 in a forward direction.

Forward rotational movement of each pinion gear 111 causes its associated crank shaft 67 to move the sealing head connecting rod 66 in an inward direction. The guide slots 72 of the sealing head guide blocks 70 and 71, maintain the various jaws a sufficient distance apart to allow the fingers of each pair of jaws to pass on opposite sides of the overlying strap portions located inwardly of the sealing head 28, and in the case of the gripper jaws 60, the jaw fingers 64 also pass on opposite sides of the anvil 59. At a predetermined position in the inward movement of the sealing head 28 however, the striker pin 76 abuts its cooperating striker surface 74 and causes closing movement of each set of jaws to commence.

There is then little or no further inward movement of the gripping and crimping jaws 60 and 77 respectively, depending upon the disposition of the striker surface 74. Thus, as inward movement of the connecting rods 66 continues, the inner ends of the respective toggle arms 65 and 86 move further apart to cause closing movement of the jaws by pivoting the jaw arms about their respective main pivot pins 73.

In the innermost position of the crimping jaws as shown in FIGURE 11, the associated pressure bars 97 are located with their inner ends engaging the outer surface of the seal blank base 138, thereby preventing outward movement of the blank 136 during crimping by the crimping jaws 77. Closing movement of the jaws can continue with the pressure bars 97 in this position because of the pivotal or rockable connection of the jaw arms 82 with their respective pressure bars 97.

Prior to commencement of closing movement of the jaws 60 and 77, the inward position of the crimping jaws 77 is such that the contained seal blank 136 has its leg portions 137 disposed on opposite sides of the overlapping portions of strap 194, and the inner surface of the blank base 138 lies adjacent the outer surface of the trailing strap portion.

Subsequent to the enagagement of the striker pin 76 and striker surface 74, the secondary piston 117 of the sealing head operating mechanism reaches the end of its stroke because of the annular shoulder 129 and boss 128 engaging, so that longitudinal movement of the rack 112 also ceases. At this stage, the fingers 64 of the gripper jaws 60 have been moved towards each other a distance such that they engage the inner surface of the leading end portion 196 of the associated strap 194 and have clamped that portion of the strap firmly against the inner surface of the anvil 59 adjacent its upper edge 62 as shown in FIGURE 19. The crimping jaws 77 however, have only partially closed so as to bend the leg portions 137 of the contained seal blank 136 towards each other to be located inwardly of the leading end portion 196 of the strap as shown in FIGURE 11. At this stage, the seal blank 136 is not clamped firmly against the overlying portions of strap 194 which it partially surrounds. Also, because of the bending of the seal blanks 136, the leg portions 137 thereof no longer engage the resting surfaces 80 of the crimping jaw fingers 78; but the blank 136 is supported on the inner side by the crimping surfaces 81 of those fingers.

During the first stage movement of the connecting rods 66, the cam plate 161 attached thereto engage the cam followers 159 of the respective ejector bell-crank levers 153. The cam surface of each plate 161 is shaped so as to cause inward movement of the cam follower 159 thereby pivoting the bell-crank lever 153 about the pivotal axis 157 as shown in FIGURE 12. Such pivotal movement raises the inner end of the lever 153, which because of its connection with the ejector body 147, raises that body and attached tongue 148 away from the crimping jaws 77.

In the fully raised position of the ejector, the terminal end of the ejector tongue 148 is located adjacent the upper wall of the magazine 139 as shown in FIGURE 12, and the innermost seal blank 136 in the magazine stack is able to be fed into the ejector slide channel 149 by the magazine platform 141. Thus, that seal blank 136 lies in the path of the ejector tongue 148 for subsequent ejection from the magazine 139 and location within the crimping jaws 77 as hereinafter described.

It is preferred that, as the secondary piston 117 reaches the end of its stroke, the rack 112 actuates a micro-switch controlling the shutter closing valve and a shutter opening hydraulic valve. The hydraulic valves are thereby operated in a manner such as to allow fluid under pressure to enter the cylinder 188 of the strap release mechanism to cause retraction of the piston thereof and thereby move the connected shutter bars 183 into their open positions as shown in FIGURES 17 and 18.

The same micro-switch may also cause the drive motor 38 to reverse, which in turn causes reverse rotation of the feed wheels 31. Consequently, the fed strap 194 is drawn back towards the supply source, and because the leading end portion 196 of each strap is firmly clamped to the anvil 59, the straps 194 are pulled out of the various platten guide channels and tensioned against the surfaces of the compressed bale 12. That is, with the exception of the bale surface adjacent the sealing heads 28, since the various straps 194 are held away from that surface by the anvils 59 and engaging gripper jaws 60.

An electronic timer may be used to control the period of reverse rotation of the feed wheels 31, and that period is predetermined so as to provide the desired length of strap 194 around a compressed bale 12. The electronic timer causes the drive motor 38 to stop and may simultaneously cause a second stage hydraulic valve to open and admit fluid under pressure to the cylinder 114 of the sealing head operating mechanism through the primary fluid inlet 131.

Alternative to using an electronic timer, a timer cam may be secured to the drive spindle 39 and arranged to operate an electric limit switch after a predetermined period of time. The period of tensioning may be varied by adjusting the position and/or shape of the timer cam.

Thus, the primary piston 116 is moved further towards the end wall 119 of the cylinder 114, and consequently causes further longitudinal movement of the rack 112. As a result, the engaging pinion gears 111 are again rotated in the forward direction so as to move the associated connecting rods 66 further inwardly.

This inward movement of the connecting rods 66 results in the fingers 78 of the crimping jaws 77 moving closer towards each other so as to tighten the contained seal blank 136 around the over-lapping portions of the strap 194. That is, the crimping jaw arms 82 tighten the longitudinal sides of the seal blank 136 against the edges of the over-lapping strap portions which the blank 136 partially surrounds, and the crimping surfaces 81 of the jaw fingers 78 direct the bent leg portions 137 of the blank 136 against the inner surface of the leading end portion 196 of the strap 194.

The gripper jaws 60 do not close further during the second stage closing of the crimping jaws 77, because of their associated lost motion devices. As the inner ends of the toggle arms 65 move apart during that second stage, the inner ends of the gripper jaws 60 cannot close any further because of their engagement with the strap portion 196 interposed between them and the anvil 59. Thus, the cam engaged springs 91 yield to allow the outer ends of the cam bars 88 to move further apart, which movement does not cause corresponding movement of the gripper jaws 60 because of the clearance between the toggle pins 69 and the associated clearance holes 93 within the gripper arms 63 (see FIGURE 19).

During the final closing movement of the crimping jaws 77, the notching plates 83 of each sealing head 28 are brought into operation. The notching plates 83 are pushed towards their respective seal blank 136 by engagement between the connecting rod pivot pin 68 and the inner end of the notching plate slot 87 through which that pin passes (see FIGURES 11 and 13).

As the connecting rod 66 approaches the end of its inward movement, the notching lands 84 of each notching plate 83 engage opposite side portions of the blank base 138 and subsequently indent that base and the underlying portions of the strap 194 as shown in FIGURE 13. Preferably, the blank engaging surfaces of the lands 84 of each notching plate 83 slope outwardly towards each other so that the indent formed thereby slopes inwardly. Such indentation firmly secures the overlapping strap portions against relative longitudinal movement.

The cutting plate 99 is also actuated during the final part of the connecting rods 66 inward movement. The actuating pin 103 of that plate 99 is engaged by the outermost wall surface of the clearance hole 104 in the adjacent pressure bar 97 as shown in FIGURES 11 and 13, after which the cutter plate 99 is moved inwardly so that its cutting edge 102 engages the trailing portion of the strap 194 in a zone above and adjacent the upper edge of the anvil 59. Continued movement of the cutter plate 99 results in that trailing portion being severed from the strap portion extending to the source of supply as shown in FIGURE 12, and the moment of severing is predetermined to occur as notching of the seal blank 136 is completed.

Alternatively, the cutting plate 99 may be moved inwardly by direct engagement with the connecting rod 66. That is, the inner end of the connecting rod 66 engages the cutter plate 99 and moves it inwardly. Outward movement of the cutter plate 99 may be effected by the actuating pin 103 engaging a surface of the clearance hole 104 in the adjacent pressure bar 97 during outward movement of the sealing head 28.

However, the cutting plate 99 does not move a sufficient distance inwardly to sever the leading end portion 196 of the strap 194 located below the crimped seal blank 136.

Inward movement of the connecting rod 66 terminates when the primary piston 116 of the sealing head operating mechanism reaches the end of its movement towards the end wall 119 of the cylinder 114. Preferably, the rack 112 is adapted to actuate a reversing hydraulic valve and the second stage hydraulic valve as the primary piston 116 reaches the end of that movement. The second stage valve is operated to shut off the supply of fluid through the primary inlet 131, and the reversing valve is operated to admit fluid under pressure to the cylinder 114 through the reversing inlet 134 thereby causing the primary piston 116, and consequently the secondary piston 117, to be fully retracted.

Retraction of the pistons 116 and 117 naturally results in reversed longitudinal movement of the rack 112, which thereby causes reversed rotational movement of the engaging pinion gears 111. Consequently, the connecting rods 66 are moved outwardly, thereby opening the associated crimping and gripper jaws 77 and 60 respectively, and returning them to the inoperative position.

As the jaws 60 and 77 are opened, the overlying portions of strap 194 contained therebetween are free to spring towards the adjacent surface of the compressed bale 12. That is, the shutter bars 183 have previously been moved to the side to allow a clear path between the overlying portions of strap 194 and the bale 12.

In addition, as each connecting rod 66 approaches the extent of its outward movement, the attached cam plate 161 allows the associated cam follower 159 to move outwardly with the result that the ejector tongue 148 slides downwardly to engage the innermost seal blank 136 and push that blank between the open crimping jaws 77. That seal blank 136 is thereby positioned in preparation for strapping a subsequent bale within the press.

The outlet door 14 of the press may then be opened and the bale ejector piston-cylinder assembly 19 actuated to push the compressed and strapped bale 12 through that door opening. The ejected bale then slides down the outlet ramp 24 for removal by any suitable means.

It will be appreciated from the foregoing description that the present invention provides an extremely effective strapping apparatus which can be adapted for use with presses of various types. In addition, the mechanism employed in the apparatus is of a relatively simple nature.

Furthermore, once strap ends have been positioned in the apparatus for strapping a first bale, subsequent operation of the apparatus may be completely automatic until fresh reels or spools of strapping are required.

What is claimed is:

1. A press for compressing and strapping a bundle including a stationary base platten, an upstanding main frame straddling said base platten, an upper primary platten mounted on said frame for movement towards and away from said base platten, a secondary platten mounted for movement between a retracted position clear of said base platten and an operative position between said base and primary plattens, said secondary platten defining a bundle engaging surface disposed substantially normal to the perspective bundle engaging surface of the primary base platten, a stationary backing platten mounted adjacent a side edge of the base platten in opposed relationship to the secondary platten, strap guide means for guiding strap relative to said plattens, and strapping apparatus constructed and arranged relative to said stationary backing platten for disposing strap through said guide means and around a bundle located within the space defined by said plattens.

2. A press according to claim 1 wherein inlet and outlet doors are arranged on opposite sides respectively of the base platten to cooperate with said plattens to form an enclosed bundle compression chamber when the primary and secondary plattens are in their operative position.

3. A press according to claim 2 wherein ejection means is provided on said inlet door and includes a piston and cylinder assembly attached to the door surface remote from said compression chamber, a piston rod projecting out of the cylinder and through an aperture in the door, and a pusher pad attached to the projecting end of said piston rod and adapted to move across at least a part of said compression chamber upon operation of the piston and cylinder assembly to provide for ejection of the bundle disposed in the compression chamber.

4. A press according to claim 3 in which the strap guide means includes at least one strap guide groove in the bundle engaging surface of at least the secondary and primary plattens, and a flexible guide strip within each of said grooves of the primary platten, each of said strips having one end clamped to the primary platten adjacent the side edge thereof adjacent the backing platten and having its opposite end portion engaging a roller attached to the primary platten, and each strip being curved downwardly away from the clamped end thereof to guide said strap downwardly and towards the secondary platten during feeding.

5. A press according to claim 4, wherein the base of the upper portion of each guide groove of the secondary platten curves upwardly and towards said backing platten, said upper curved portion being arranged to engage the adjacent end of the strip of the corresponding primary platten groove when the secondary platten is moved into its operative position between the primary and base plattens, thereby flexing said strip to provide a relatively smooth transition between the respective guide grooves of the primary and secondary plattens.

References Cited

UNITED STATES PATENTS

| | | | |
|---|---|---|---|
| 157,205 | 11/1874 | Koehl | 100—232 XR |
| 625,307 | 5/1899 | Adams | 100—25 |
| 868,738 | 10/1907 | Webb | 100—295 XR |
| 1,121,571 | 12/1914 | Sheppard | 100—7 |
| 2,732,792 | 1/1956 | White | 100—25 |
| 2,876,696 | 3/1959 | White | 100—25 |
| 2,959,118 | 11/1960 | Hager | 100—26 |
| 2,966,816 | 1/1961 | White. | |
| 3,195,447 | 7/1965 | Taylor | 100—218 XR |
| 3,220,337 | 11/1965 | Goland et al. | 100—7 |

BILLY J. WILHITE, *Primary Examiner.*

U.S. Cl. X.R.

100—218, 232, 26, 269, 295, 30